United States Patent
Seifert et al.

(10) Patent No.: US 8,083,133 B2
(45) Date of Patent: Dec. 27, 2011

(54) SYSTEM AND METHOD FOR ACCOUNTING FOR ACTIVATION OF STORED VALUE CARDS

(75) Inventors: Dean A. Seifert, Dublin (IE); Mark Baumgart, Larkspur, CO (US); Thomas Sayor, Castle Rock, CO (US)

(73) Assignee: The Western Union Company, Englewood, CO (US)

( * ) Notice: Subject to any disclaimer, the term of this patent is extended or adjusted under 35 U.S.C. 154(b) by 0 days.

(21) Appl. No.: 11/122,414

(22) Filed: May 4, 2005

(65) Prior Publication Data

US 2006/0249570 A1    Nov. 9, 2006

(51) Int. Cl.
*G06Q 20/00* (2006.01)
*G06Q 30/00* (2006.01)
*G06Q 40/00* (2006.01)
*G06K 5/00* (2006.01)
*G06K 15/00* (2006.01)
*G07F 19/00* (2006.01)

(52) U.S. Cl. .......... 235/380; 235/379; 235/383; 705/17; 705/35; 705/39; 705/26.1

(58) Field of Classification Search .......... 235/380, 235/375, 376, 381, 382, 379, 493, 383; 705/39, 705/40, 5, 26, 27, 35, 49, 17, 26.1; 713/165; 455/419; 230/380, 379, 383

See application file for complete search history.

(56) References Cited

U.S. PATENT DOCUMENTS

| | | | | |
|---|---|---|---|---|
| 4,578,530 A * | 3/1986 | Zeidler | | 705/71 |
| 4,928,001 A * | 5/1990 | Masada | | 235/380 |
| 5,721,768 A * | 2/1998 | Stimson et al. | | 379/114.16 |
| 6,829,596 B1 * | 12/2004 | Frazee | | 705/66 |
| 7,093,761 B2 * | 8/2006 | Smith et al. | | 235/380 |
| 7,252,226 B2 * | 8/2007 | Risafi et al. | | 235/381 |
| 7,496,525 B1 * | 2/2009 | Mitchell | | 705/26.8 |
| 2002/0046341 A1 * | 4/2002 | Kazaks et al. | | 713/182 |
| 2002/0120530 A1 * | 8/2002 | Sutton et al. | | 705/26 |
| 2002/0153410 A1 * | 10/2002 | Santini | | 235/375 |
| 2003/0001005 A1 * | 1/2003 | Risafi et al. | | 235/380 |
| 2003/0092435 A1 * | 5/2003 | Boivin | | 455/419 |
| 2003/0110136 A1 * | 6/2003 | Wells et al. | | 705/64 |
| 2004/0054622 A1 * | 3/2004 | Strayer et al. | | 705/39 |
| 2004/0139318 A1 * | 7/2004 | Fiala et al. | | 713/165 |
| 2005/0091152 A1 * | 4/2005 | Suisa | | 705/39 |
| 2005/0108126 A1 * | 5/2005 | Cai et al. | | 705/35 |
| 2005/0123112 A1 * | 6/2005 | New et al. | | 379/114.2 |
| 2005/0127168 A1 * | 6/2005 | Phillips et al. | | 235/380 |
| 2005/0192892 A1 * | 9/2005 | Willard | | 705/39 |
| 2005/0199705 A1 * | 9/2005 | Beck et al. | | 235/380 |
| 2005/0199706 A1 * | 9/2005 | Beck et al. | | 235/380 |
| 2005/0269415 A1 * | 12/2005 | Licciardello et al. | | 235/493 |
| 2006/0045244 A1 * | 3/2006 | New | | 379/93.12 |
| 2006/0078099 A1 * | 4/2006 | Liebenow et al. | | 379/114.2 |
| 2006/0144926 A1 * | 7/2006 | Jacobs | | 235/380 |

\* cited by examiner

*Primary Examiner* — Thien Mai (74) *Attorney, Agent, or Firm* — Kilpatrick Townsend & Stockton LLP (57) ABSTRACT

Stored value cards, such as gift cards, from different card issuers are displayed for sale and activation at retail locations. A distribution database system maintains records of cards sold at the retail locations. The system accounts to each retailer for commissions owed for cards sold by that retailer, and accounts to each card issuer for its cards that are sold at each retail location.

13 Claims, 5 Drawing Sheets

SYSTEM AND METHOD FOR ACCOUNTING FOR ACTIVATION OF STORED VALUE CARDS

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

Stored value, gift, or other pre-paid metered accounts associated with debits cards are well-known for providing access to goods and services. For example, gift cards may be purchased from various merchants such as Target®, Wal-Mart®, Starbucks®, Sears®, Blockbuster®, and the like. Pre-paid debit cards are also frequently purchased for telephone services. The purchase and usage of pre-paid debit cards has continued to increase in recent years to the point that the sale of pre-paid debit cards today is a multi-billion dollar industry. Pre-paid cards, such as gift cards issued by a merchant, are advantageous to the merchant because customers using them are more likely to shop the merchant and also more likely to spend beyond the initial value of the gift card. Other prepaid cards may be issued by a bank or money transfer office, and may be used like a credit card to make purchases, up to the balance maintained within the card account.

In some cases, pre-paid debit cards are printed and issued with a predetermined value and balance, and typically sold as a retail item. An example of one such a card is a pre-paid gift card which provides an individual with a set dollar amount for the purchase of goods from a particular merchant. In other cases, a gift card may be printed without a predetermined value, but when it is purchased and activated the customer pays for the amount of money to be "loaded" onto the card.

Clearinghouse arrangements have been set up to handle gift card accounts on behalf of merchants. For example, ValueLink, L.L.C., a unit of First Data Corporation, provides database services that merchants may access for activating and maintaining gift card accounts. When the card is purchased, the card is electronically read (e.g., by reading a magnetic stripe or printed bar code on the card) by the merchant to activate the account at the database. Once activated, the card is used to make purchases (redemptions) by reading the card at the time of purchase and debiting the purchase amount from the account.

Merchants typically offer gift cards for their own business. However, this does not always lead to widespread use of the cards. For example, the more locations a gift card is offered for sale (i.e., locations other than at the business location of the gift card merchant), the more likely it is that consumers will purchase cards and use them. While one merchant offering gift cards for its own business might make individual arrangements with another merchant in order to sell the other merchant's cards (in addition to its own), such arrangements would not provide the efficiencies, systems and economies of scale needed to effectively offer multiple gift cards for different merchants at a single merchant location.

BRIEF SUMMARY OF THE INVENTION

There is provided, in accordance with embodiments of the present invention, a system and method for providing stored value cards from a plurality of card issuers for purchase/activation at a retail location.

In one embodiment, the system includes a POS device at retailer locations where stored value cards, such as prepaid gift cards, are offered for sale and may be activated, and where the POS device receives identifying data (e.g., a product code) from each card to be activated by the retailer. The identifying data is provided to a distribution database, which creates an activation record for each activated card. A database management or processing system associated with the distribution database uses the activation record to calculate any amounts owed to the retailer selling the card or owed to the entity issuing the card.

A more complete understanding of the present invention may be derived by referring to the detailed description of the invention and to the claims, when considered in connection with the Figures.

DETAILED DESCRIPTION OF THE INVENTION

Figure 1:
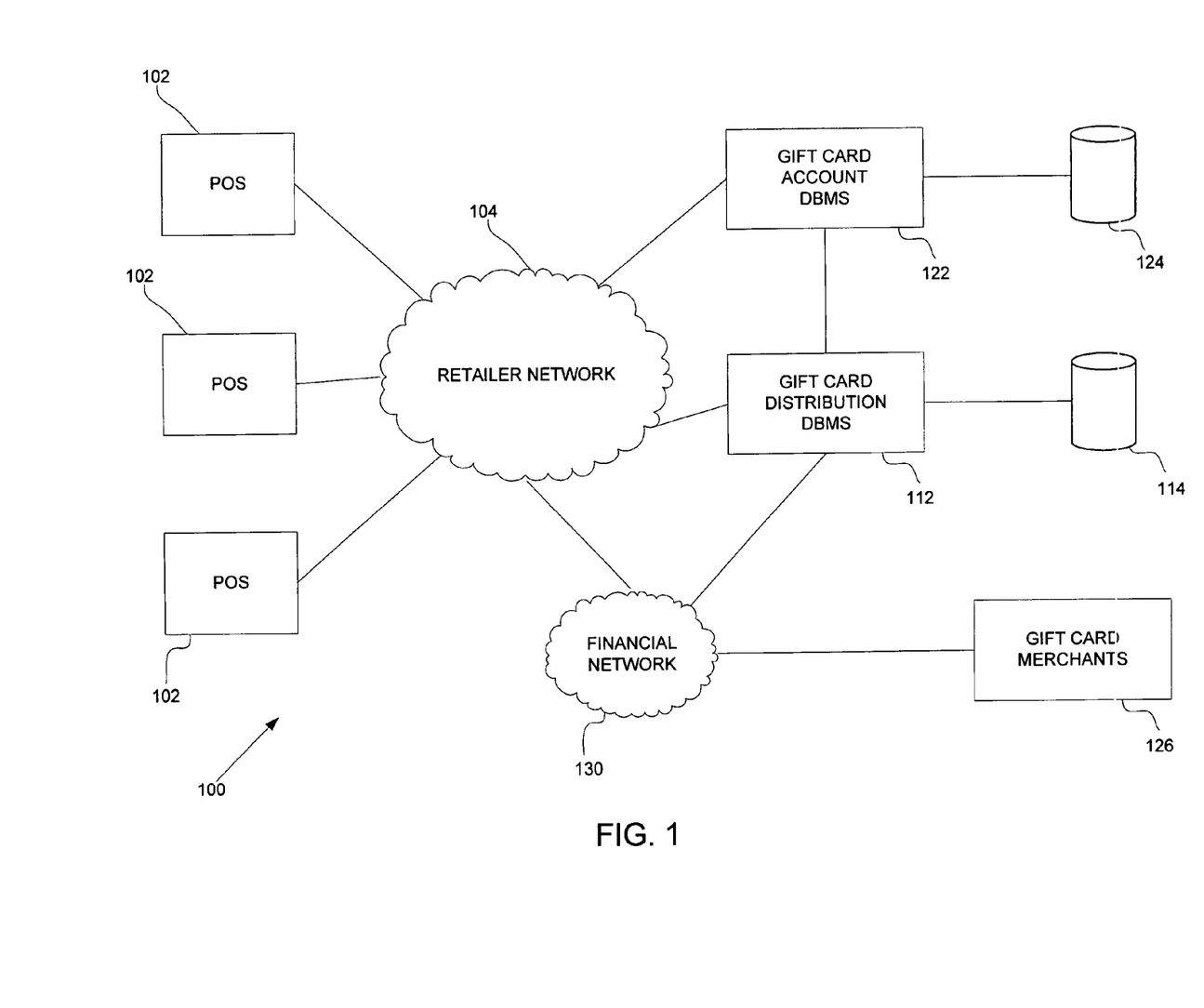
FIG. 1 illustrates a network in which a prepaid gift card is activated and used.

There are various embodiments and configurations for implementing the present invention. One such implementation is shown in FIG. 1, where according to one embodiment of the invention, a system 100 includes a plurality of point-of-sale (POS) terminals 102 connected to a retail network 104. The network 104 is of a well known type, wherein the POS terminals 102 may be located at one (or more) retail establishments. The POS terminals have price look-up and other functionality, either internally or through interconnection to a server or database (not shown) within the retail network 104.

The retail locations at which the POS terminals 102 are located are stocked with gift cards to be displayed for purchase by customers at the POS terminals (the gift cards will be describe later in greater detail in conjunction with FIG. 2). In order to facilitate the purchase, activation and use of gift cards, the system 100 includes a gift card distribution database management system (DBMS) 112 and its associated database 114 and a gift card account database management system (DBMS) 122 and its associated database 124. The distribution DBMS 112 is accessed when a gift card is purchased, in order to facilitate the activation of the card and to account to the retailer and the gift card merchant for the purchase of the card. The account DBMS 122 is used to activate and maintain an account for each activated gift card including, for example, posting the original gift card amount to an account, and permitting debits against that account as purchases are made by using the gift card.

As also seen in FIG. 1, the various components of the system 100 are connected to each other and to gift card merchants 126 through a financial network 130. The financial network 130 is intended to represent conventional banking or financial networks for carrying out at least two different broad categories of transactions:

(1) Payments among retailers, gift card merchants and the operator of the distribution DBMS 112 (on account of sales of gift cards, and as will be described later in conjunction with FIGS. 3 through 5). For example, the financial network could represent banking channels through which ACH transactions or even paper checks may be issued to make payments between the parties involved.

(2) Credit card and similar transactions initiated by a customer at the POS terminals 102 for purchasing products at retail locations (these are not purchases made using gift cards).

The gift card account functions provided by the gift card account DBMS 122 and its database 124 are well known, one example being the previously mentioned ValueLink service operated by ValueLink, L.L.C. The gift card account DBMS receives an account number for each gift card being purchased (and not yet activated) at one of the POS terminals, and if it recognizes it as an available account number, an account is established with the initial gift card amount. The DBMS 122 maintains the account and post transactions to it when the gift card is used. For example, if the card is used at one of the POS terminals 102 after it has been activated, the gift card account number and the amount of the transaction is provided by the POS terminal to the DBMS 122 so that the transaction can be posted against the gift card account. It should be understood that even though the gift card merchants 126 are designated separately from the POS terminals 102 for purposes of activating gift cards, a POS terminal 102 may be located and used at a gift card merchant location when the gift card merchant acts as a retailer, i.e., when a gift card is being used for purchases at a retail location of the gift card merchant.

Figure 2:
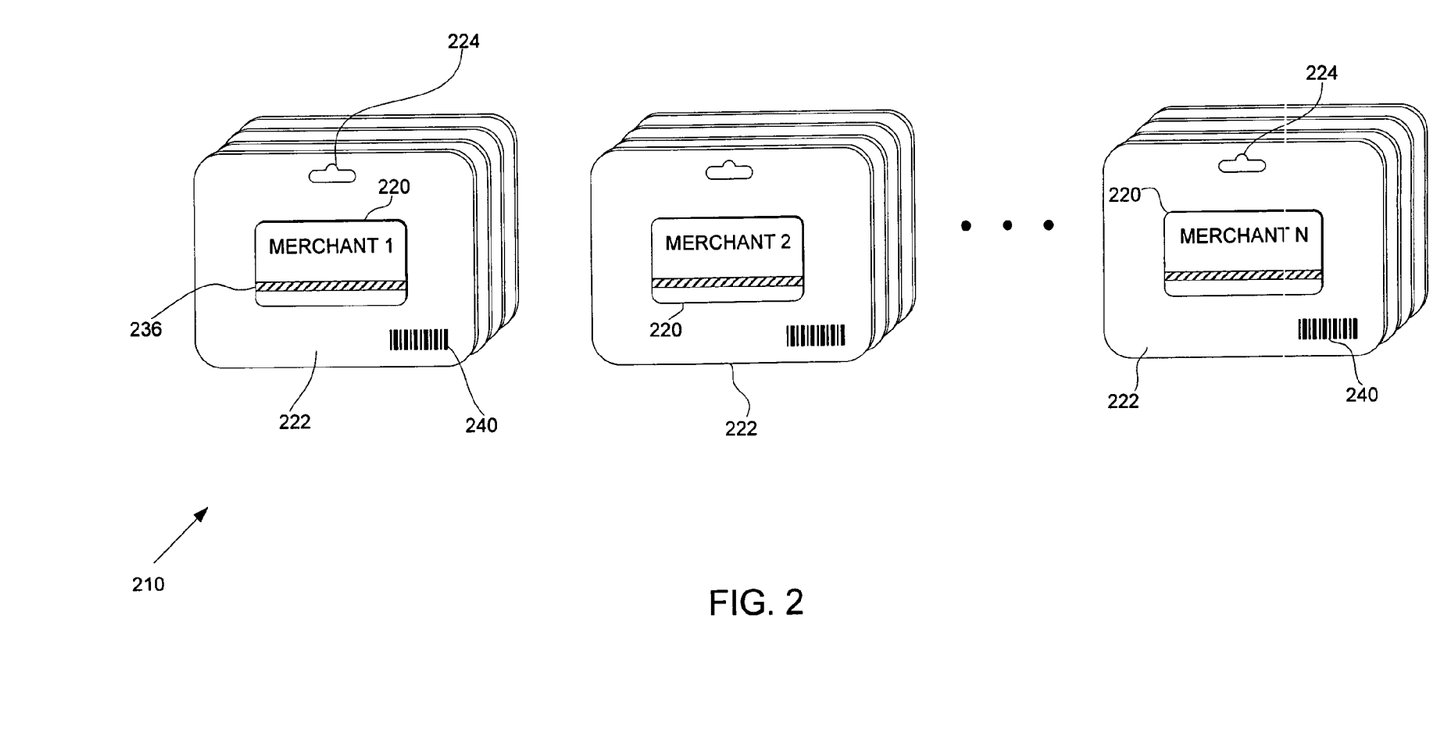
FIG. 2 illustrates gift cards from different gift card merchants, displayed for sale at a retail location.

Referring now to FIG. 2, there is seen a display 210 for a plurality of gift cards 220, each mounted for display on a card carrier 222. Each card carrier 222 has a slot 224 to permit the card carrier to be hung (with other card carriers) on a hook at a retail location. Each gift card has data stored thereon (e.g., on a magnetic strip 236) that identifies a unique account number for that card. In a somewhat similar fashion, the card carrier has data stored thereon (e.g., as a bar code 240) that identifies the card according to card or product type. In one embodiment, the bar code 240 is a universal product code (UPC) that identifies at least the gift card merchant. In some embodiments, it may also be used identify the face amount of the card (if the card has as predetermined face value) or a card theme (e.g., a holiday gift card, a birthday gift card, a special promotional card for certain products offered by the merchant, and so forth). In yet other embodiments, the bar code 240 may also be used to identify various internal selling codes, such as a commission/fee due to the retailer who sells the card, and a commission/fee due to the distributor who may aggregate cards from different gift card merchants and distribute them to retailers (such a distributor would also operate the distribution DBMS 112, and use it for accounting for such commissions and fees).

The gift cards 220 are from a plurality of different gift card vendors. As illustrated in FIG. 2, each merchant's gift cards may be arranged and displayed together (the cards hung from each hook at display 210 are all from the same gift card merchant). Thus as seen in FIG. 2, the cards of merchant #1 are hung together, the cards of merchant # 2 are hung together, and so forth. However, it should be appreciated that one merchant could if desired have more than one card type for sale at the display 210 (e.g., each type representing a different face amount, or representing a different promotional theme), in which case that merchant may have more than one group of cards at display 210. However, for purposes of organizing the display 210, and enabling customers to readily distinguish on card type from another, it would be desirable for all cards of the same type to be hung together (on the same hook), and thus the bar codes 240 for the cards hung together to be the same.

As will be described in greater detail later, when a card is to be purchased, the customer removes that card from the display 210, and takes it to a clerk at one of the POS terminals 102 (FIG. 1). The clerk uses a bar code scanner (not shown) at the POS terminal 102 to read the bar code 240 (to determine the card type, card price, etc.), and then uses a magnetic stripe reader (not shown) at the POS terminal to read the account number from the magnetic stripe 236. Such information could also be entered manually by the clerk, and in the case of a self-service POS terminal, could even be entered by the customer. The POS terminal/retailer network may have price look-up tables and various software features that provide the purchase price for the card and provide instructions at the POS terminal to lead the clerk through the card activation process. The gift card account associated with the card is activated by account DBMS 122. Once activated, the customer may take the card to a retail establishment operated by the gift card merchant and use it to make purchases or redemptions (the magnetic stripe 236 is read at the POS terminal during the redemption in order to identify the activated account associated with the card).

As mentioned earlier, and in accordance with one embodiment of the invention, the gift card distribution DBMS 112 is used to facilitate the activation of gift cards and to account to the retailer and gift card merchant for commissions and fees arising from a customer purchasing a gift card at one of the POS terminals 102. This is carried out by the DBMS 112 in conjunction with data stored in its associated database 114. FIG. 3 illustrates several database tables stored in the database 114 for this purpose.

Figure 3:
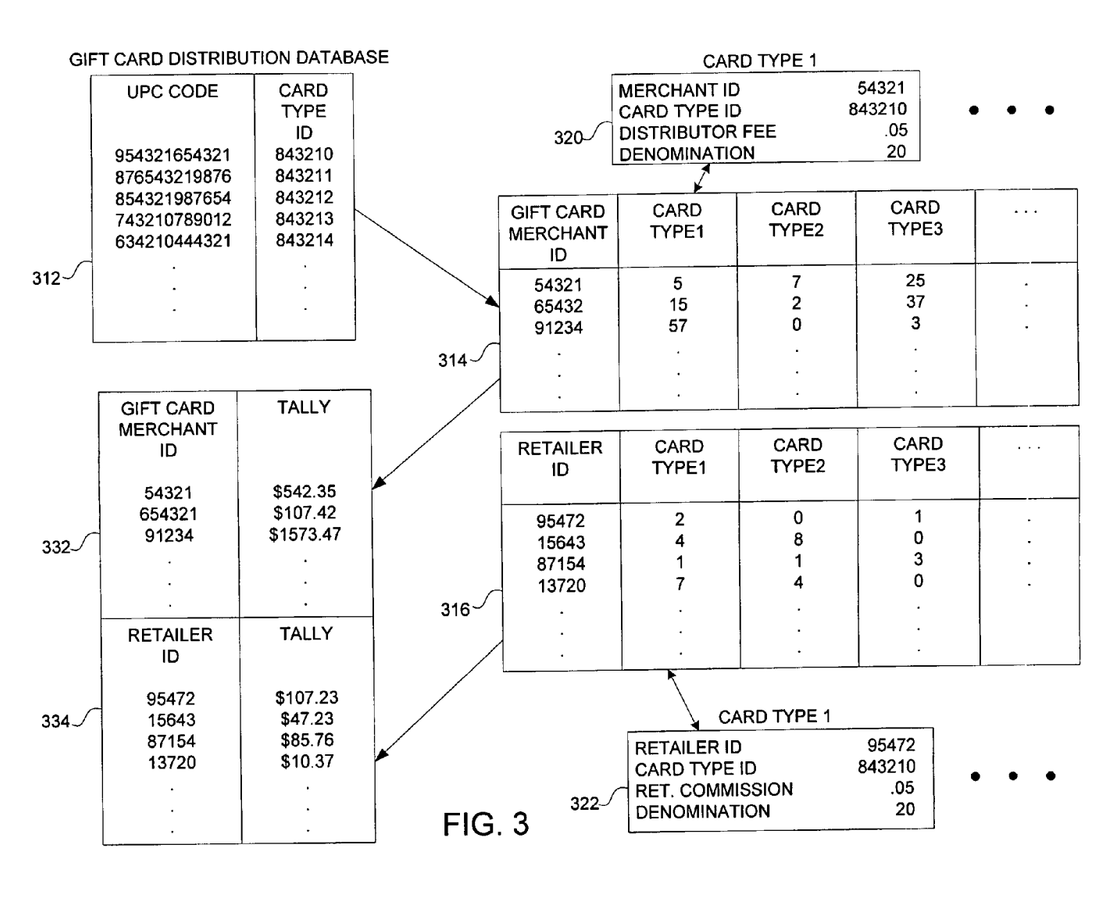
FIG. 3 illustrates database tables within the gift card distribution database seen in FIG. 1.

Referring to FIG. 3, a database table 312 is used to convert UPC codes (read from the bar codes 240 on the card carriers 222) into internal product codes (card type IDs) established by the gift card merchants. It should be appreciated that the UPC code (or other product code) that is electronically (or manually) entered at the POS terminal 102 could also serve as the card type ID. However, particularly for UPC codes, involving very lengthy strings of numbers or digits, it may be more convenient for a gift card merchant to chose a shorter and more easily handled card type ID, such as that illustrated in FIG. 3.

As mentioned earlier, each UPC code (and its corresponding card type ID) will identify various attributes of the card that are used to track and account for fees and commissions arising from the purchase of the card. Thus, a record is made for each gift card purchase at a merchant database table 314 (which tracks gift cards sold for each gift card merchant) and a retailer database table 316 (which tracks gift cards sold by each retailer).

Thus, as seen in FIG. 3, the merchant table 314 maintains a count of sold cards (an activation record) for each merchant (identified by a merchant ID) that has issued the distributed cards, according to card type. In a similar manner, the retailer table 316 maintains a count of sold cards (an activation record) for each retailer (identified by a retailer ID) that has sold cards, according to card type.

As illustrated at box 320, the database tables maintain for each card type (and for each merchant ID) in merchant table 314, data as to the merchant ID, card type ID, distributor fee (the amount that will be retained by the distributor that operates the distribution DBMS 112, before paying the gift card merchant), and the denomination or face value of the card. Likewise, as illustrated at box 322, the database tables maintain for each card type (and for each retailer ID) in retailer table 316, data as to the retailer ID, card type ID, retailer commission (the commission that will be paid by the distributor to the retailer that sold the card), and the denomination or face value of the card.

It should be noted that the box 322 provides data for each retailer to have potentially a different commission (even if selling the same card), and thus there is a different set of data (with a different commission) in each box 322 for each retailer according to card type. This would apply when different retailers negotiate different commissions for selling the same card (e.g., because of sales volumes). As should be apparent, if the same commission is paid to all retailers for the same card type ID, then only a single box of data (for all retailers) is associated with each card type.

As also illustrated in FIG. 3, the DBMS 112 maintains a tally within database 114 for each merchant and retailer (merchant tally 332 and retailer tally 334) that is periodically computed and paid to each such merchant and retailer. The tally for each merchant is computed by taking the total sales of gift cards issued by that merchant (adding up the face value of all cards sold) and deducting the commissions owed to retailers selling those cards, and further deducting the discount/distribution fee for those cards that is to be retained by the distributor). The tally for each retailer is computed by taking the total sales of all gift cards sold by that retailer and applying the appropriate commission rates to those cards. As will be described later, tallies are made at periodic intervals according the accounting processes set up by the distributor (e.g., daily, weekly, etc.).

Figure 4:
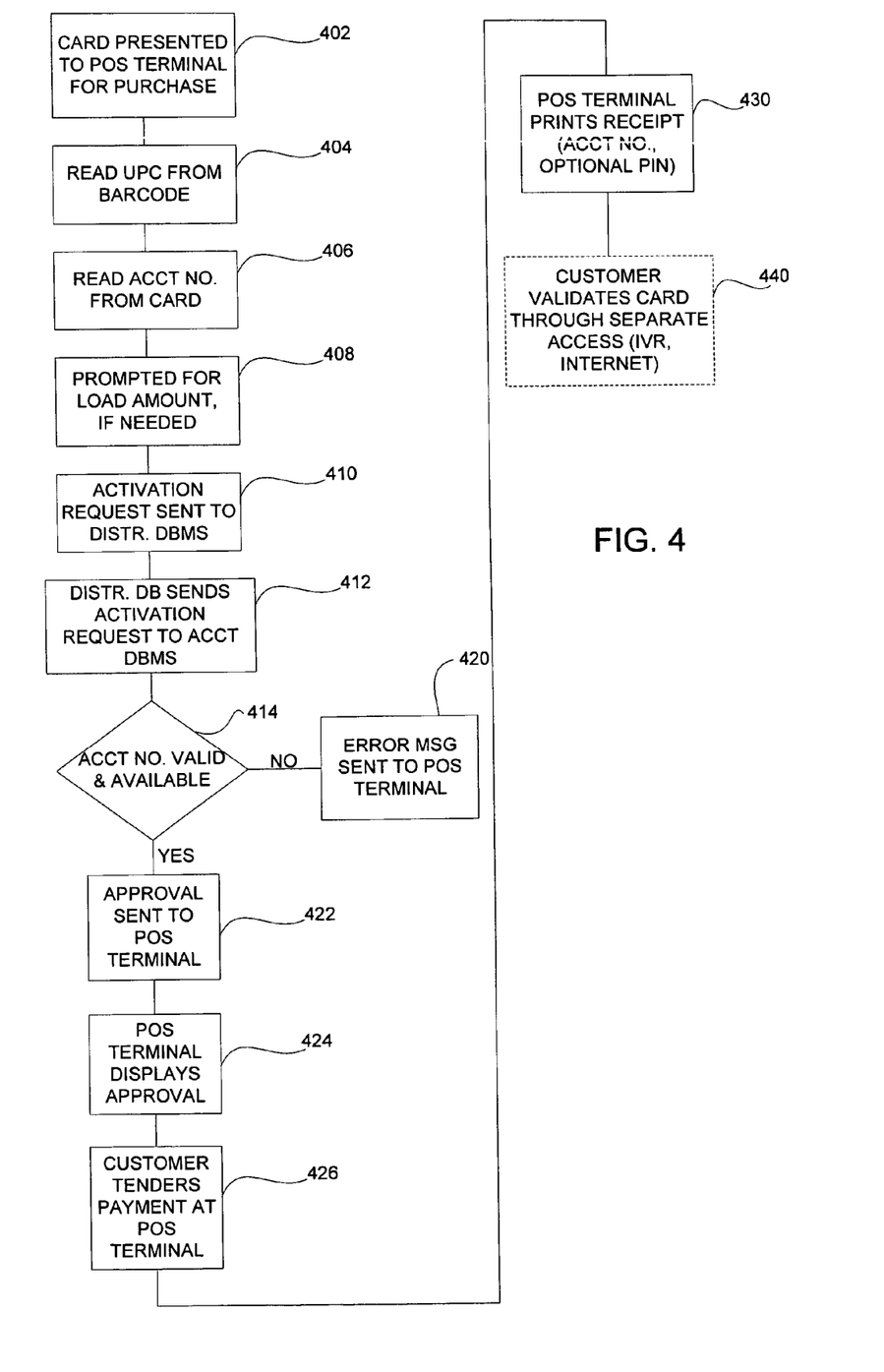
FIG. 4 is a flow diagram illustrating the activation of a gift card within the network of FIG. 1.
Figure 5:
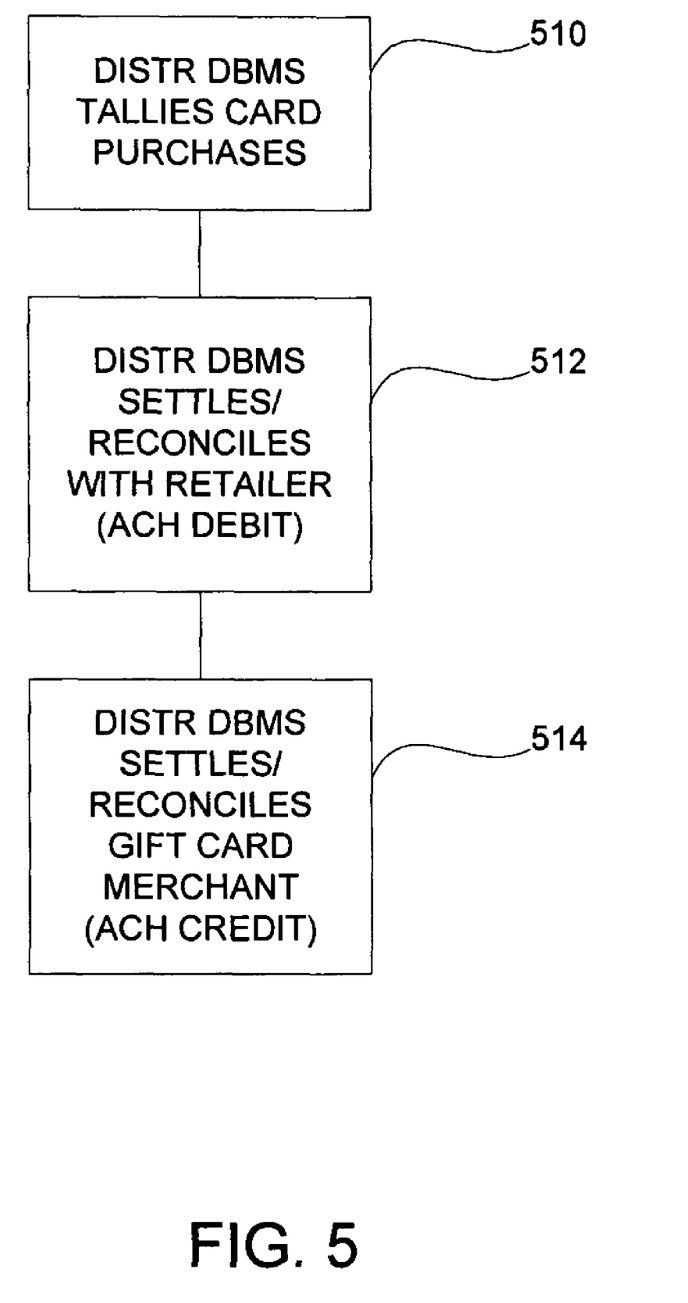
FIG. 5 is a flow diagram illustrating the process used for accounting to a retailer and to a gift card merchant for activated gift cards.

The processes for managing and accounting for card sales are implemented in software code largely resident in the retail network 104 and distribution DBMS 112, and operating in accordance with the process and program steps seen in the flow diagrams of FIGS. 4 and 5.

Referring to FIG. 4, there is seen a flow diagram illustrating one embodiment of the invention where gift cards (such the gift cards seen in FIG. 2) are purchased and activated, and an accounting is made to both the retail merchant selling the card and the gift card merchant issuing the card. After a gift card has been selected by a customer, such as from a display at a retail establishment, the card is presented at step 402 to a POS terminal 102 (FIG. 1), where the UPC code 240 is read by a bar code reader, step 404. The clerk at the POS terminal is then instructed (such as by commands generated by the POS terminal) to enter the account number from the card, such as by manually entering the account number at a POS keyboard or by swiping the card at a magnetic stripe reader, step 406. If the card does not have a predetermined value or denomination, the clerk is also prompted to enter a load amount (the value that the customer wants to load onto the card as part of the purchase), step 408. It should be appreciated that the steps thus far described, as well as other steps in the activation process to be described below, can be implemented at the POS terminal alone or in conjunction with a local/remote retail server or database within retail network 104. That is, the UPC code read from the gift card is provided to a look-up table (not shown) within the POS terminal or retailer server that determines the card type (including its denomination, if applicable) and issues instructions to the clerk at the POS terminal to enter other information required for purchase (such as the account number from the card, a load value, etc.).

When the card is being purchased by a customer, and in response to entry of the UPC code and account number at the POS terminal, an activation request is sent, step 410, to the distribution DBMS 112 (FIG. 1), which checks the account number against a set of available and valid account numbers pre-stored in the associated database 114, and if valid, forwards the activation request to the account DBMS 122, step 412. The account DBMS 122 validates the account in the database 124 (so that the account is activated for future transactions using the gift card, and the value of the gift card is credited to the account).

If the account is not available or valid, step 414, either at the distribution DBMS 112 or at the account DBMS 122, the DBMS 112 sends an error message, step 420, to the POS terminal (e.g., the gift card may be old or obsolete, and the clerk may ask the customer to select a different card, or if the card is being loaded with value, the customer may have chosen an amount that is above the acceptable maximum or below the acceptable minimum load value, and the clerk will ask the customer to select a different value for the account). If the account number and card are valid at step 414, the distribution DBMS returns an approval to the POS terminal, step 422, which is displayed at the POS terminal (step 424) so that the clerk may ask the customer to tender payment (step 426) and then print a receipt for the customer, step 430.

While not shown in FIG. 4, the validated gift card account could be temporarily marked as pending within database 124 until the POS terminal 102 sends payment confirmation to distribution DBMS 112 (i.e., after the customer had tendered payment, e.g., through cash payment or presentation of a credit card), and the distribution DBMS forwards the confirmation to the account DBMS 122 so that the account is made fully active and no longer pending.

As should be appreciated, many variations in the process steps of FIG. 4 are possible, depending on the type of account being set up. For example, while it is contemplated that a gift card is activated in the described embodiment, other cards may be activated and the process of FIG. 4 modified as appropriate. As one example, the card being activated may be a prepaid credit card, and thus the distribution DBMS 112 may be connected to a credit card account DBMS (not shown), with the distribution DBMS 112 directing activation requests to the credit card DBMS (rather than the gift card DBMS 122) when the prepaid credit card has been presented for purchase at a POS terminal 102.

Some prepaid or stored value cards may require the customer to go through an additional step (illustrated by the step 440 in FIG. 4) in order to validate a card purchased at a retail establishment. For example, if the card being purchased is for a prepaid mobile phone account, the customer may be required, after purchasing the card, to separately access the card merchant (issuer) either through a telephone call to an interactive voice response (IVR) system or by accessing a website, in order to provide the customer's mobile telephone number to the card merchant and thereby associate that telephone number with the card account (so that the phone minutes or monetary value associated with use of the card can be deducted from the card account as it is being used by the customer).

As yet another example of other types of stored value cards, the customer may buy a virtual card that may be used to make purchases (rather than a card that is physically presented to make purchases at the gift card merchant). In such an example, the customer might select a displayed item bearing a UPC bar code (but no account number) at a retail establishment, and after the bar code is read, an account number is returned by the DBMS 112 to the POS terminal, where the receipt printed at the POS terminal (step 430) may bear the account number and also a PIN that the customer could use (without presenting a card) to make subsequent purchases against the account. In other embodiments, the customer may receive a physical card, but a PIN is required for use of the card, and such PIN may be provided to the customer on the printed receipt.

As yet another example, the stored value card could be a prepaid debit card or cash card that could be used to make cash withdrawals (in addition to or in lieu of purchases at a retail establishment). The user or customer could make withdrawals, using the card at an ATM or the like.

In FIG. 5, there is illustrated the process by which tallies are made (for gift cards purchased at POS terminals 102) and an accounting is made to each of the retailers and gift card merchants. At step 510 the distribution database 510 tallies the gift cards purchased for both each retailer and each gift card merchant. For each retailer, the tally is made by adding up for all gift cards purchased and activated by a retailer, the purchase price of each card (or value loaded onto the card) multiplied by the retailer commission for that card. For each gift card merchant, the tally is made by adding up for all activated gift cards issued by that merchant, the purchase price of each card, less the commission paid to the retailer and less any distributor fee owed to the distributor for that card. Boxes 332 and 334 (FIG. 3) show the results for those tallies for various gift card merchants and retailers.

The distribution DBMS 112 then periodically reconciles the account of each retailer (step 512). In the case where the retailer and distributor have accounts that may have transactions posted using electronic ACH (Automated Clearing House) transfers, each retailer's account may be posted with a debit (for the purchase price of all cards purchased, less commission owned to the retailer), and such amount is also simultaneously posted to the account of the distributor. The distribution DBMS also reconciles the account of each gift card merchant, step 514, by crediting the account of the merchant with the total tally of card purchases (less commissions owed to retailers and less the distributor fees). The amount of distribution fees are thus retained in the account of the distributor.

While the system is illustrated as involving ACH transfers between the retailer, distributor and gift card merchant, it should be appreciated that other forms of payment transfers could be made, such as paper checks issued and sent from the retailer to the distributor, and similarly papers checks issued and sent from the distributor to the gift card merchant.

In some cases, the retailer may be part of a chain of retailers, or a group of retail chains that are owned by a single retail organization, parent or holding company. The retail organization may issue a different card type for each retailer or for each chain of retailers, and receive payments and reports that segregate retailers/chains so that card activation activity and reports can be issued at any level within the retail organization.

Also, when reference is made herein to "activating" an account, it should be appreciated that such term is used in its broadest sense. For example, a card may be activated as part of its initial purchase (the card has a predetermined face value), or as part of the customer's selection of a value (monetary amount) to be loaded on the card during its initial purchase (the card has no predetermined face value), or as part of the customer loading a previously activated/purchased card with additional value.

Further, it should be appreciated that the accounting between the distributor and the retailer/distributor may be implemented differently, depending on arrangements between the parties. For example, cards may be purchased by a distributor (at a discount) and then distributed to retailers, so that the distribution DBMS 112 only needs to account for activated cards between the retailer and the distributor. Likewise, the retailer may purchase may purchase card from the distributor (at a discount) and distribution DBMS 112 only needs to account for card activation between the card issuer (merchant) and the distributor. Other arrangements (involving multi-tiered distribution) are also possible, and the DBMS 112 can account for card activation among the multi-tiered distributors in such an arrangement.

While a detailed description of presently preferred embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A system for purchasing and activating gift cards from a plurality of card issuers, wherein the plurality of card issuers are gift card merchants at which the gift cards may be used for purchases or redemption, wherein the gift cards are physically distributed to retail locations by a distributor, and wherein amounts owed on account of the purchase and activation are calculated, the system comprising:
   a POS device at retailer locations where at each location the gift cards from a plurality of different card issuers are separately purchased and activated, the POS device for receiving identifying data from each gift card to be activated by the retailer;
   a distribution database operated by the distributor for receiving the identifying data and creating an activation record for each activated card, wherein the identifying data includes a universal product (UPC) code, and wherein each UPC code is associated with at least one card type ID stored in the database for each of the plurality of card issuers, and wherein for each card type ID there is both associated distributor fee data and associated retailer commission data;
   a separate gift card account database for establishing an account in response to an activation request having the identifying data for the card to be activated, the gift card account database operated by an independent party that is not the retailer, distributor, or one of the plurality of card issuers;
   a distribution processing system associated with the distribution database and operated by the distributor, wherein the processing system forwards the activation request to the gift card account database for establishing the account for the card to be activated, and wherein the processing system uses the activation record to calculate any amounts owed to at least one of the retailer, distributor and plurality of card issuers for cards purchased and activated at the retailer locations, so that not only the physical distribution of cards, but also the activation of cards and the accounting for amounts owed among the retailer, distributor and each of the plurality of card issuers are all handled by the distributor; and
   a financial network for conducting electronic ACH (Automated Clearing House) transfers to an account of at least one of the retailer, distributor and plurality of gift card issuers for paying any owed amounts calculated by the processing system;

wherein the UPC code is associated with data in the distribution database that identifies one of the plurality of card issuers, and for each card type of each issuer, a commission rate used for paying retailers, a distribution fee paid to the distributor that distributes the gift card to the retailer locations, and a value associated with the gift card.

2. The system of claim 1, wherein the distribution database stores the commission rate, the distribution fee, and the face value of the gift card, and wherein the distribution processing system uses the stored commission rate, distribution fee and the stored face value in order to aggregate and make periodic payments to the issuing gift card merchant and to retailers.

3. The system of claim 1, wherein the UPC code appears on a card carrier, and wherein the distribution database includes a table relating the UPC code on the card carrier to a card type ID.

4. The system of claim 3, wherein the distribution database includes a table relating the card type ID to the issuing gift card merchant, the commission rate used for paying retailers, the distribution fee paid to the distributor that distributes the gift card to the retailer locations, and the face value of the gift card.

5. The system of claim 4, wherein transactions conducted with each card are posted to the account established in the account database, wherein the identifying data read from each card further includes an account ID identifying its associated account in the account database, with the account ID received at the distribution database as part of the identifying data and provided to the account database in order to activate the associated account.

6. A method for activating stored value cards from a plurality of different card issuers that are physically provided by a distributor and displayed at a single retailer location for purchase and activation, wherein the plurality of card issuers are gift card merchants at which the gift cards may be used for purchases or redemption, the system comprising:

providing a POS device at the retailer location, the POS terminal for receiving identifying data from a stored value card to be activated by the retailer;

providing the identifying data to a distribution database operated on behalf of the distributor in order to create an activation record in the distribution database and forwarding the identifying data as an activation request from the distribution database to an account database in order to activate the card;

wherein an account is associated with each activated stored value card and wherein the account is maintained for one of a plurality of card issuers at the account database;

wherein the identifying data includes both an account ID identifying the associated account and a separate universal product (UPC) code, wherein the UPC code is associated with at least one card type ID stored in the database for each of the plurality of card issuers, and wherein for each card type ID there is both associated distributor fee data and associated retailer commission data;

processing the activation record in the distribution database to calculate any amounts owed to the retailer, distributor and each of the plurality of card issuers for each card activated at the retailer location, based on the distributor fee data and the retailer commission data; and posting transactions using ACH (Automated Clearing House) transfers at financial accounts of the retailer, distributor and each of the plurality of card issuers in order to pay the amounts owed;

wherein the UPC code is further associated with data that identifies one of the plurality of card issuers and for each card type of each issuer, a commission rate used for paying retailers, a distribution fee paid to the distributor that distributes the stored value card to the retailer locations, and a value associated with the stored value card;

wherein not only the physical distribution of stored value cards, but also the activation of stored value cards and the accounting for amounts owed among the retailer, distributor and the each of the plurality of card issuers are all handled by the distributor.

7. The method of claim 6, wherein the stored value card is purchased by a customer at the retail location, and wherein the method further comprises:

after purchase of the stored value card at the retail location, subsequently providing activation data to the card issuer in order to complete activation of the card.

8. The method of claim 7, wherein the stored value card is a prepaid mobile telephone card and wherein the activation data provided to the card issuer is the telephone number of the customer purchasing the card.

9. The method of claim 8, wherein the step of subsequently providing activation data to the card issuer comprises using a telephone to access an interactive voice response system operated on behalf of the card issuer to provide the activating data.

10. The method of claim 8, wherein the step of subsequently providing activation data to the card issuer comprises accessing a website operated on behalf of the card issuer to provide the activating data.

11. The system of claim 1, wherein the distribution processing system determines the validity of the identifying data for the card before forwarding the activation request to the account database.

12. The system of claim 1, wherein the distribution processing system determines validity of the identifying data for the card by checking the identifying data against data stored in the distribution database.

13. The system of claim 1, wherein the identifying data for the card is an account number, and wherein the distribution database stores valid account numbers that the distribution processing system uses in determining validity of the identifying data.

* * * * *

UNITED STATES PATENT AND TRADEMARK OFFICE
CERTIFICATE OF CORRECTION

PATENT NO.       : 8,083,133 B2
APPLICATION NO.  : 11/122414
DATED            : December 27, 2011
INVENTOR(S)      : Dean A. Seifert et al.

It is certified that error appears in the above-identified patent and that said Letters Patent is hereby corrected as shown below:

Column 8, line 11, please delete the first occurrence of "may purchase".

Column 8, line 11, please delete "card" and insert --cards--.

Signed and Sealed this
Sixth Day of March, 2012

David J. Kappos
*Director of the United States Patent and Trademark Office*